United States Patent [19]

Pobanz et al.

[11] Patent Number: 5,525,993
[45] Date of Patent: Jun. 11, 1996

[54] MICROWAVE NONCONTACT IDENTIFICATION TRANSPONDER USING SUBHARMONIC INTERROGATION AND METHOD OF USING THE SAME

[75] Inventors: Carl W. Pobanz, Rancho Palos Verdes; Tatsuo Itoh, Los Angeles, both of Calif.

[73] Assignee: The Regents of the University of California, Oakland, Calif.

[21] Appl. No.: 440,003

[22] Filed: May 12, 1995

[51] Int. Cl.⁶ .................................................. G01S 13/76
[52] U.S. Cl. .................................. 342/51.000; 342/44
[58] Field of Search ............................ 342/42, 44, 51

[56] References Cited

U.S. PATENT DOCUMENTS

| | | | |
|---|---|---|---|
| 4,739,328 | 4/1988 | Koelle | 342/44 |
| 4,782,345 | 11/1988 | Landt | 343/727 |
| 4,827,395 | 5/1989 | Anders et al. | 364/138 |
| 4,901,307 | 2/1990 | Gilhousen et al. | 370/18 |
| 5,448,243 | 9/1995 | Bethke et al. | 342/59 |

OTHER PUBLICATIONS

"An Automatic Vehicle ID System for Toll Collecting," L. Livermore Natl Lab Report No. UCRL-TB-113409, Apr. 1993.
P. deBruyne et al, "Radar Surveillance of Autobahn Toll".
T. Ohta et al., "Compact Microwave remote recognition system with newly developed SSB moduclation," IEEE MTT-S Digest pp. 957-960 (1990).
R. Page, "A Low Power RF ID Transponder," RF Design, pp. 31-35, Jul. 1993.

*Primary Examiner*—John B. Sotomayor
*Attorney, Agent, or Firm*—Daniel L. Dawes

[57] ABSTRACT

A credit-card sized microwave transponder for "wireless key" and surveillance applications uses a subharmonically-pumped quasi-optical mixer. The transponder is activated by a C-band interrogation beam to upconvert and radiate a digitally modulated identification tone at X-band frequencies nonharmonically related to the interrogation signal.

20 Claims, 4 Drawing Sheets

FROM MODULATOR

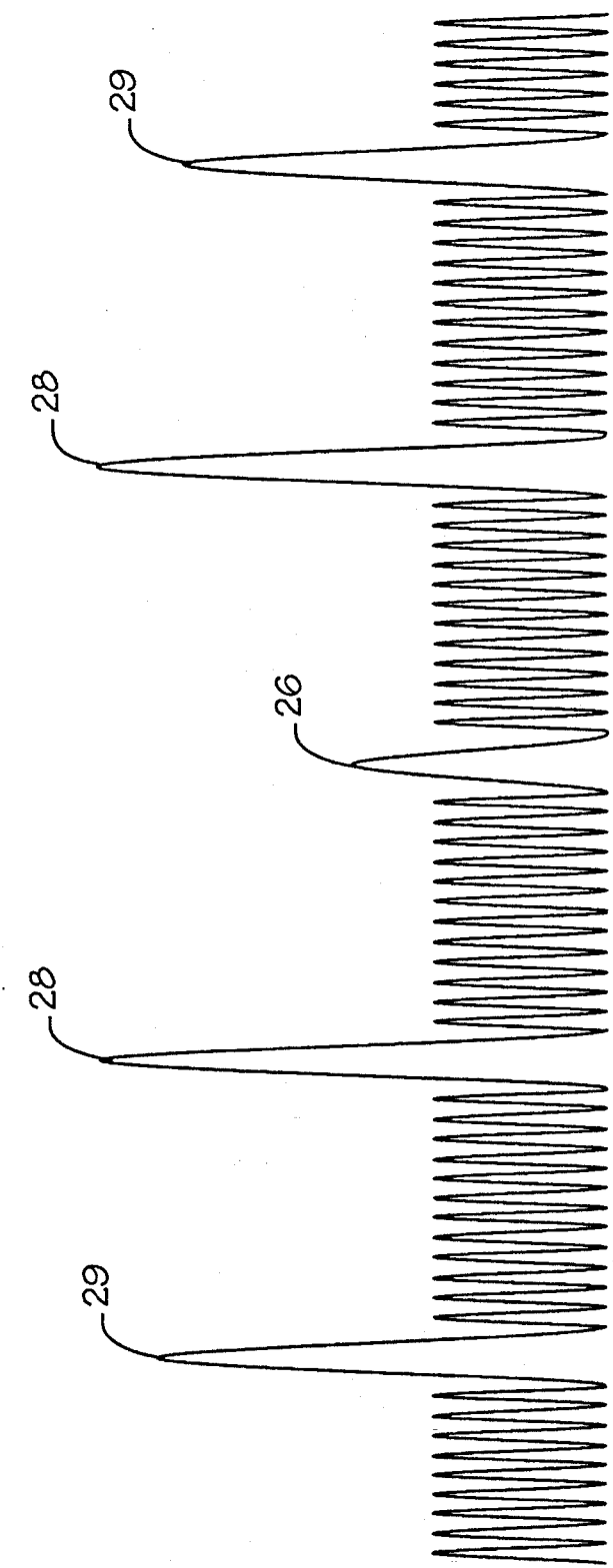
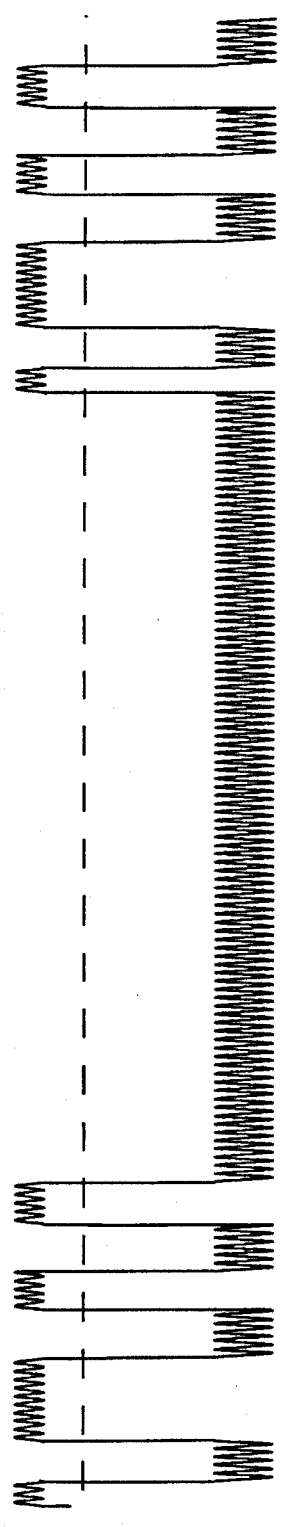
FIG.2a
FIG.2b

MICROWAVE NONCONTACT IDENTIFICATION TRANSPONDER USING SUBHARMONIC INTERROGATION AND METHOD OF USING THE SAME

BACKGROUND OF THE INVENTION

1. Field of the Invention

The invention relates to the field of small microwave transponders for "wireless key" and surveillance applications, and in particular to transponders that are activated by an interrogation beam to upconvert and radiate a digitally modulated identification tone.

2. Description of the Prior Art

The need for automatic identification of objects and personnel has grown rapidly in recent years with the increased use of computerized systems for security and control tasks. Noncontact identification schemes using radio frequencies (RF/ID systems) have several advantages over comparable optical systems, such as better penetration of obstructing materials (e.g., clothing, soot) and easier electronic manipulation of the identifying signals. Microwave frequencies in particular are attractive due to relatively low radio noise and interference levels, wide available bandwidth for high-speed data transfer, and physically small high-gain antennas.

In a typical system, transponders (ranging from electronic ID badges to antitheft tags) are read, or interrogated, by a microwave beam which causes them to emit a coded response. Various types of response signals are in use, including simple back scatter with modulation in amplitude, ("An Automatic Vehicle ID System for Toll Collecting," Lawrence Livermore National Laboratory, Report No. UCRL-TB-113409, April 1993), phase (P. de Bruyne and P. Leuthold, "Radar Surveillance of Autobahn Toll), or both (i.e., SSB) (T. Ohta, H. Nakano, and M. Tokuda, "Compact microwave remote recognition system with newly-developed SSB modulation," IEEE MTT-S Digest, pp.957–960, 1990), or generation of a continuous or modulated harmonic of the interrogation signal (R. Page, "A Low Power RF ID Transponder," RF Design, pp. 31–35, July 1993).

In the prior art systems where an active response is generated, the responding signal was usually close to the frequency of the interrogating signal or was harmonically related thereto and therefor lay within the interference band of the interrogating signal. Also the transponder card needs a microwave source. As a result, false detection resulting from an interrogator receiving reflections of its own transmitted harmonics could arise.

What is needed is a transponder in the form of an ID card which is interrogated at frequency fi and generates a response frequency modulated with an identification code at microwave frequencies apart from the interrogation signal, away front interference in the interrogation band, and without the need for a microwave source on the transponder card. The frequencies should not be harmonically related to the interrogation signal in order to avoid the problem of false detection resulting from an interrogator receiving reflections of its own transmitted harmonics.

BRIEF SUMMARY OF THE INVENTION

The invention is an improvement in a contactless transponder having a modulation oscillator, a quasi-optical mixer having a first input coupled to the modulation oscillator, and an antenna having an input coupled to an output of the mixer. The improvement comprises an identification code generator coupled to a second input of the mixer. The mixer modulates an interrogation signal received by the antenna where the interrogation signal has a frequency, $f_i$, with a data carrier signal having a frequency, $f_d$, which is generated by the modulation oscillator. The result is that supressed-carrier double sideband response signals are transmitted through the antenna. Each sideband response signal is modulated by an identification code generated by the identification code generator. The data frequency, $f_d$, is at a nonharmonic value of the interrogation frequency, $f_i$, so that false detection arising from reflections of transmitted harmonics of the interrogation signal is avoided.

The antenna is a bow-tie antenna and the suppressed carrier frequency is at a second harmonic, $2f_i$, of the interrogation frequency, $f_i$, while the double sideband response signals have frequencies of $2f_i \pm f_d$.

In the illustrated embodiment the response signal generated by the transponder is characterized by two or more upper and lower modulated sideband response signals each.

In another embodiment the modulation oscillator generates a plurality of data carrier signals, $f_{di}$, so that the transponder generates a corresponding plurality of upper and lower modulated sideband response signals.

The improvement further comprises a source of power coupled to the transponder, a slot antenna, a diode coupled to the slot antenna, and a detector circuit coupled to the diode for detecting when an interrogation signal is received by the slot antenna and diode. The detector circuit generates a detection signal indicative of interrogation of the transponder. The interrogation signal is coupled to the transponder to change the state of operation of the transponder from a power-save mode with minimum power consumption to a more power consuming operating mode. The slot antenna is tuned for the interrogation frequency, $f_i$.

The invention can also be defined as a method for providing an identification response to an interrogation signal comprising the steps of generating a data carrier signal having a frequency, $f_d$, and modulating the data carrier signal with an identification code. An interrogation signal having a frequency, $f_i$, is received. The modulated data signal at frequency, $f_d$, and interrogation signal at frequency, $f_i$, are mixed to obtain a suppressed-carrier double sideband modulated response signal. The data carrier signal is a radio frequency signal and the interrogation signal is a microwave signal. As a result, a reliably detectable response signal is generated in the transponder.

The step of generating the data carrier signal is performed at a frequency which is a nonharmonic of the interrogation frequency, $f_i$, so that false detections resulting from reflected interrogating signals of transmitted harmonics is avoided.

The method further comprises the steps of receiving the interrogation signal at frequency, $f_i$, detecting the received interrogation signal, and activating the transponder from a power-save mode to an operable mode where power is consumed when the interrogation signal is received. The step of receiving the interrogation signal is received with a tuned slot antenna. The step of detecting the interrogation signal is detected in a Schottky diode coupled to the tuned slot antenna.

In one embodiment the step of generating the data carrier signal at the data frequency, $f_d$, comprises generating a plurality of distinct data carrier signals, each at a different frequency, $f_{di}$, to permit subsequent simultaneous interrogation of multiple transponders.

The invention may now be better visualized by turning to the following drawings wherein like elements are referenced by like numerals.

BRIEF DESCRIPTION OF THE DRAWINGS

FIG. 1a is an enlarged scale view of the portion of FIG. 1 within circle 1a—1a.

FIGS. 2a and b are spectrum analyzer screens showing the response signals around 12 GHz, and the demodulated digital ID code "10110101" being received by a test system respectively.

The invention and its various embodiments is better understood by now turning to the following detailed description.

DETAILED DESCRIPTION OF THE PREFERRED EMBODIMENTS

A credit-card sized microwave transponder for "wireless key" and surveillance applications uses a subharmonically-pumped quasi-optical mixer. The transponder is activated by a C-band interrogation beam to upconvert and radiate a digitally modulated identification tone at X-band frequencies nonharmonically related to the interrogation signal.

Figure 1:
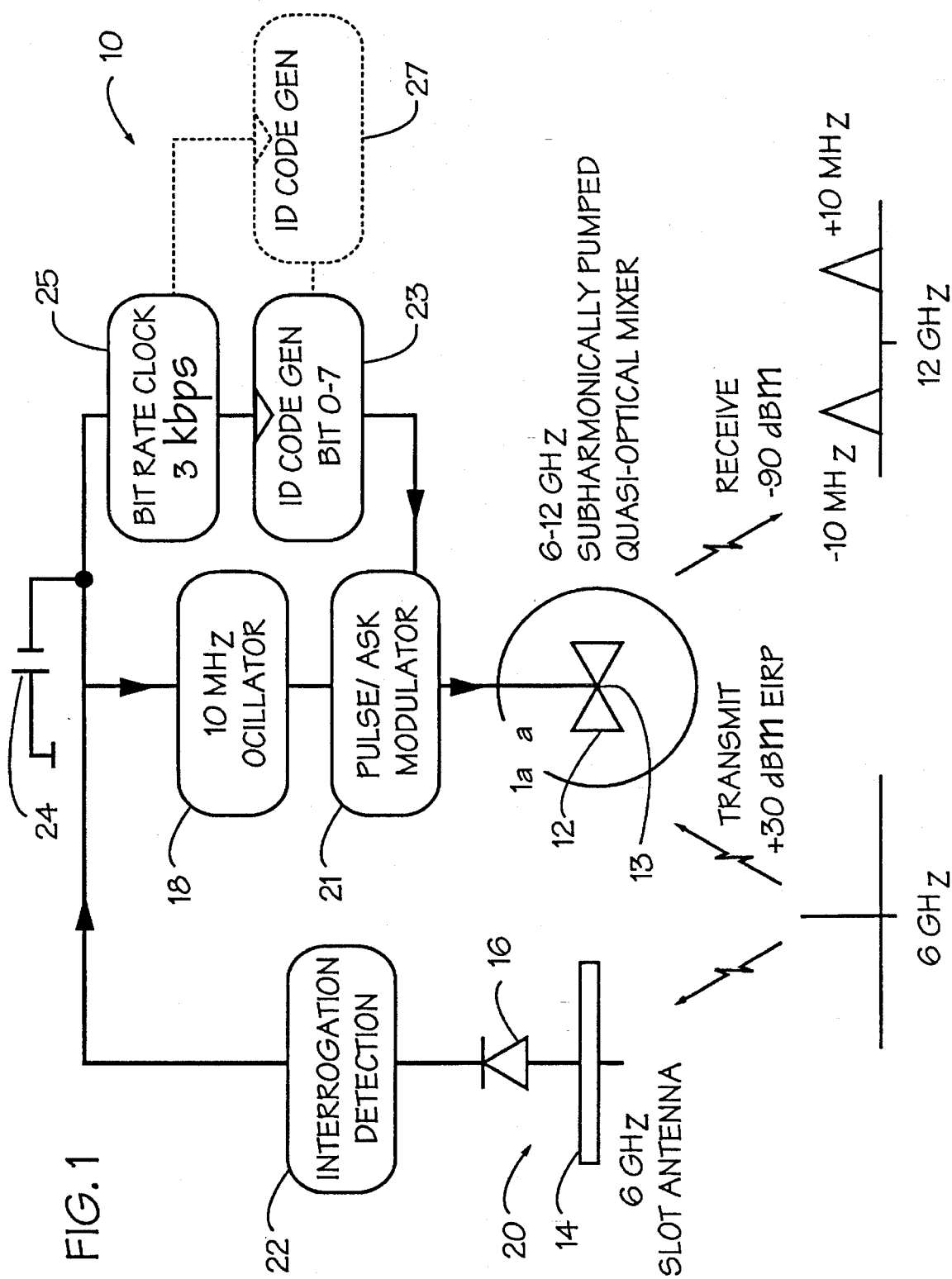
FIG. 1 is a highly abstracted block diagram of the circuitry of the card.

In the illustrated embodiment a transponder, generally denoted in the schematic of FIG. 1 by reference numeral 10, is packaged in the form of an ID card (note shown) which is interrogated at frequency $f_i$ (e.g., 6 GHz), from which it upconverts a locally generated data signal at $f_d$ (e.g., 10 MHz) to the response frequencies $2f_i \pm f_d$ (11.990 GHz, 12.010 GHz) which are radiated. The data carrier signal $f_i$, and hence the response signal, is amplitude shift keyed (ASK) modulated with an 8-bit identification code, which can be easily expandable to over 32 bits. The advantages of this scheme include the creation of new microwave frequencies an octave apart from the interrogation signal, away from interference in the interrogation band, without the need for a microwave source on transponder card 10. Unlike in harmonic-generation transponder systems, these frequencies are not harmonically related to the interrogation signal. Therefore, the problem of false detection resulting from an interrogator receiving reflections of its own transmitted harmonics is avoided. The carrier tone $f_d$ and the data sequence can be used independently or jointly to uniquely identify the card. As the response frequency is a direct function of the interrogation frequency, this scheme is inherently compatible with a frequency-hopped spread spectrum interrogation approach. In addition, the subharmonic interrogation method makes this approach attractive for millimeter-wave applications, allowing use of lower frequency sources.

Transponder card 10 is based upon a quasi-optical mixer structure first proposed by Stephan and Itoh for imaging arrays and telemetry applications. See, K. Stephan and T. Itoh, "A Planar Quasi-Optical Subharmonically Pumped Mixer Characterized by Isotropic Converion Loss," IEEE Trans. Microwave Theory Tech., vol. MTT-32, pp. 97–102, January 1984). See also K. Stephan and T. Itoh, "Inexpensive Short Range Microwave Telemetry Transponder," Electronic Letters, Vol. 20, No. 21, pp 877–78 (October 1984).

Figure 1A:
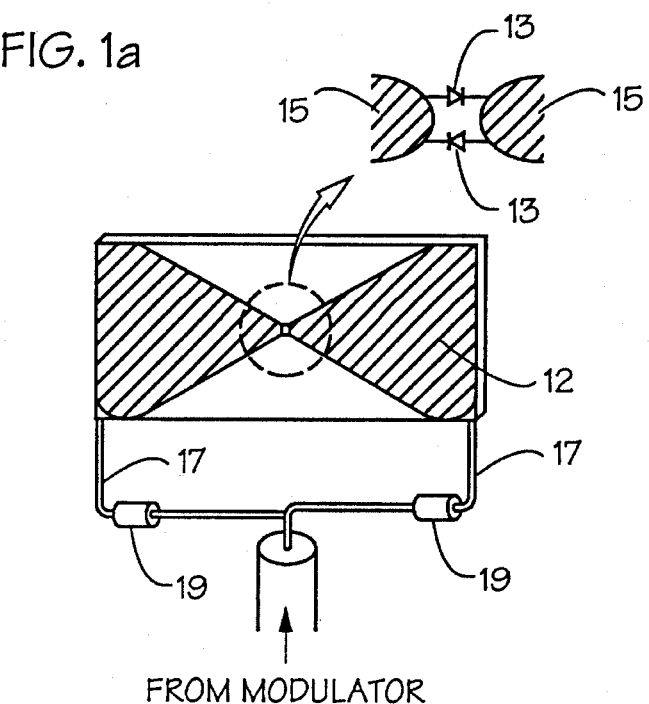

This structure is comprised of an antiparallel Schottky diode pair 13 mounted at the terminals of a planar bow-tie (triangular dipole) antenna 12 as shown in FIG. 1a, which is an enlarged depiction of portion 1a—1a of FIG. 1. The broadband nature of this structure allows it to receive the interrogation signal, to mix the interrogation signal with an AC modulation signal as controlled by a DC biasing signal, and to transmit the response an octave apart on a modulated frequency near the doubled interrogation signal which is suppressed.

The mixer as shown in FIG. 1a is comprised of bow-tie antenna 12 and a pair of low-barrier Schottky diodes 13 connected head to tail in parallel across the antenna terminals 15. Low frequency modulation as discussed below is fed to diodes 13 via supporting wires 17 through ferrite beads or spiral inductors 19, which help to confine the RF currents to the antenna structure. The bow-tie antenna's terminal impedance is relatively stable over an octave bandwidth. Antenna 12 is therefore reasonably efficient both as a receiver of the fundamental frequency interrogation signal at $f_i$ and as a transmitter of the response signals around the suppressed second harmonic at $2f_i$.

Suppose transponder 10 is now irradiated by an interrogation system's transmitter with a wave at frequency $f_i$. Let the modulator, discussed below, apply an AC wave of frequency $f_d$ whose peak voltage is chosen so as to cause optimum signal frequency mixing in each diode 13. When one diode 13 is forward biased, the other diode 13 is cut off and can be ignored. As the modulating signal changes sign, diodes 13 alternately generate current at $2f_i$ to create a double-sideband suppressed carrier signal with sideband of frequencies $2f_i \pm f_d$. Phase reversal between positive and negative modulation peaks is provided by the antiparallel connection between diodes 13 and antenna 12.

Once the modulated second harmonic signal is generated, bow-tie antenna 12 operates at its upper end frequency range to radiate the signal back to the interrogations system's receiver (not shown), where either or both sidebands may be demodulated.

As the antiparallel diode pair 13 has only odd terms in its nonlinear i-v curve, it generates only odd order mixing products in response to a multitone input. Apart from the linear scattering of the interrogation signal, the dominant mixing product is the desired third-order term at $2f_i \pm f_d$. All even order currents, including the second harmonic and DC, circulate only in the loop circuit between by diodes 13.

In order to conserve the battery power required for the data generation circuitry, an additional diode receiver 20 is used to generate a DC control signal in response to an interrogation. A microstrip-fed one wavelength slot 14 is cut in the ground plane of the card and is impedance-matched to a Schottky diode 16 to form a C-band receiver, generally denoted by reference numeral 20, with a wide beamwidth comparable to that of bow-tie antenna 12. The DC signal from this receiver is detected by conventional detection circuitry 22 which generates a signal to activate transponder 10 from a power-conserving standby state. Low-power CMOS (74HC) was used in conjunction with discrete transistors on the card of transponder 10 for generation of the 10 MHz modulated data signal from oscillator 18. Operating and standby currents were 1 mA and 25 µA, respectively, from a +1.5 V silver oxide wristwatch battery 24. Reducing the standby current to 1 µA could increase the battery life from 1–2 years to 10 years, when interrogated one minute daily.

The locally generated 10 MHz modulating signal from oscillator 18 was then amplitude shift keyed (ASK) by modulator 21. Modulator 21 in turn is controlled by an identification code generator 23 which outputs a fixed, programmable 8 bit code as timed by bit rate clock 24 operating at 3 kbaud. Additional or an extended code may be output if desired by means of a supplementary code generator 27 also driven and appropriately timed by clock 25 and having its output coupled to generator 23 or coupled in parallel thereto.

The frequency spacing between $2f_i$ and $f_d$ can be varied among a plurality of transponders 10 to allow the number of ID code bits to be expanded and also to allow the number of distinguishable transponders 10 to be increased in any given interrogation view. For example, although the range of interrogation in the illustrated embodiment is 10 feet, the presence of multiple transponders is contemplated. The modulated carrier frequencies, $f_d$, for the transponders can then be spaced at 1 MHz intervals to allow for a series of distinguishable transponders carrying the same set of codes. A set of 256 transponders can be supported by an eight bit ID code. However, if two transponders with different IDs were within interrogation view both would respond at the same modulated sideband frequencies with different IDs and hence provide an ambiguous signal. By offsetting the modulated sideband frequencies from each other, multiple sets of 256 transponders can be supported and simultaneously interrogated without ambiguity.

Consider now the operation of transponder 10. Transponder 10 is interrogated from an interrogator system (not shown) at a distance of 5 feet. The transmitted power was 125 mW into a +15.5 dBi pyramidal horn (+36 dBm EIRP), and a +22 dBi horn feeds the HP8562A receiver, which with preamplifier has a sensitivity of −105 dBm. The scattered response signal is shown in FIGS. 2a and b. FIG. 2a shows the carrier suppressed double sideband signal retransmitted from transponder 10 in response to an interrogation signal, $f_i$, at 6.003875 GHz. A suppressed center frequency 26 at 12.00775 GHz is shown with upper and lower sidebands 28 at 12.03775 and 11.9775 GHz, which are in turn carrier signals modulated by the ASK ID code. An additional second harmonic 29 of upper and lower sidebands 28 is also shown and can be used as well. FIG. 2b shows the demodulated sideband 28 in which the ID code, 10110101, has been transmitted. Therefore, by spacing the modulated data signal, $f_d$, and, if desired, using different ones of the four sidebands, multiple simultaneous detection of different sets of transponders can be performed. For an eight bit code, each modulated data frequency can then accommodate 1024 transponders, and the number of transponders which can be simultaneously detected expanded to 262,144 transponders with a 16 bit code.

The equivalent circuit was subjected to a harmonic balance analysis to determine the effect of the embedding impedances presented to the mixer comprised of diodes 13 and bow-tie antenna 12. The devices employed were a Hewlett-Packard HSCH-5530 low-barrier Schottky diode pair in a beam-lead T package. The measured device parameters in conjunction with published impedance data for the 90-degree flared bow-tie were used, and an optimum antenna electrical length of 60–100 degrees at 6 GHz was obtained.

Figure 4:
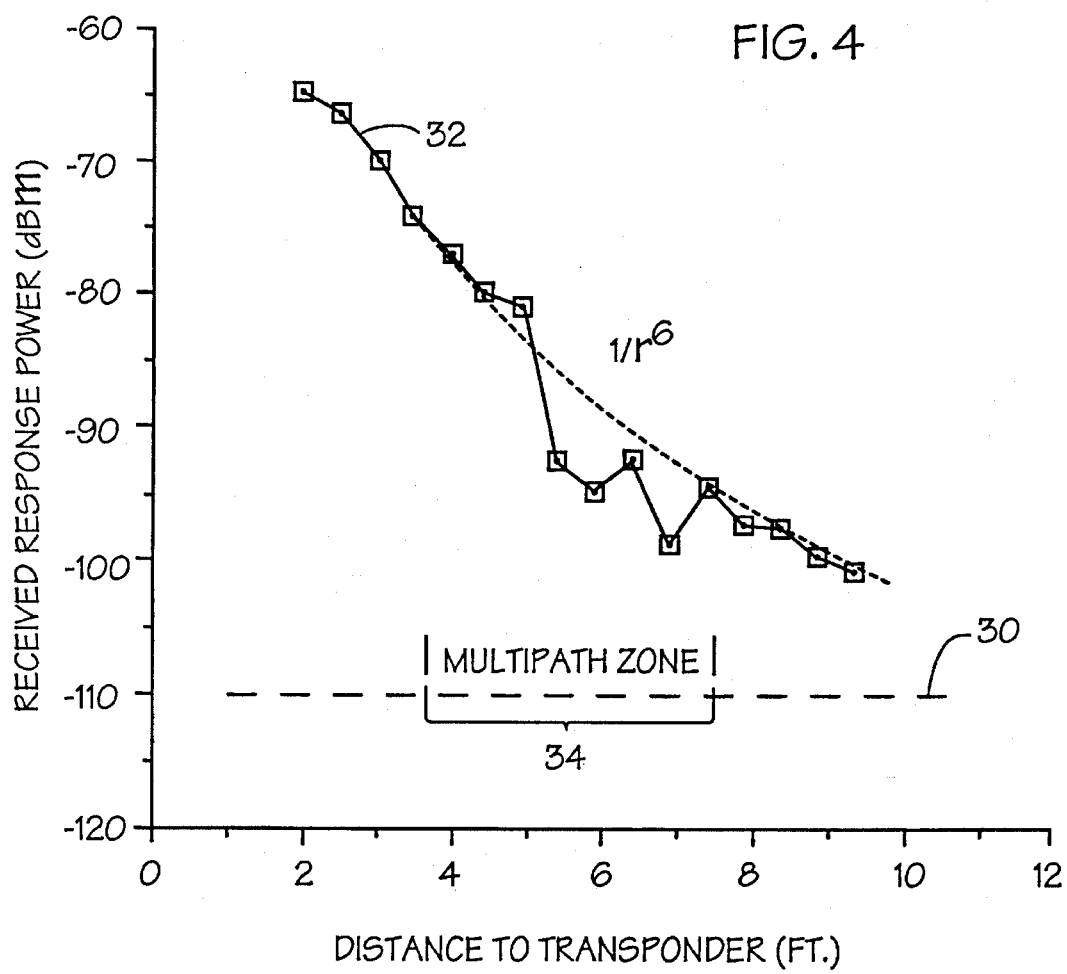
FIG. 4 is a plot of the power received by the interrogator back from the card as graphed against distance to the card. This indicates a maximum reading range of about 10 feet for this test system.
Figure 3A:
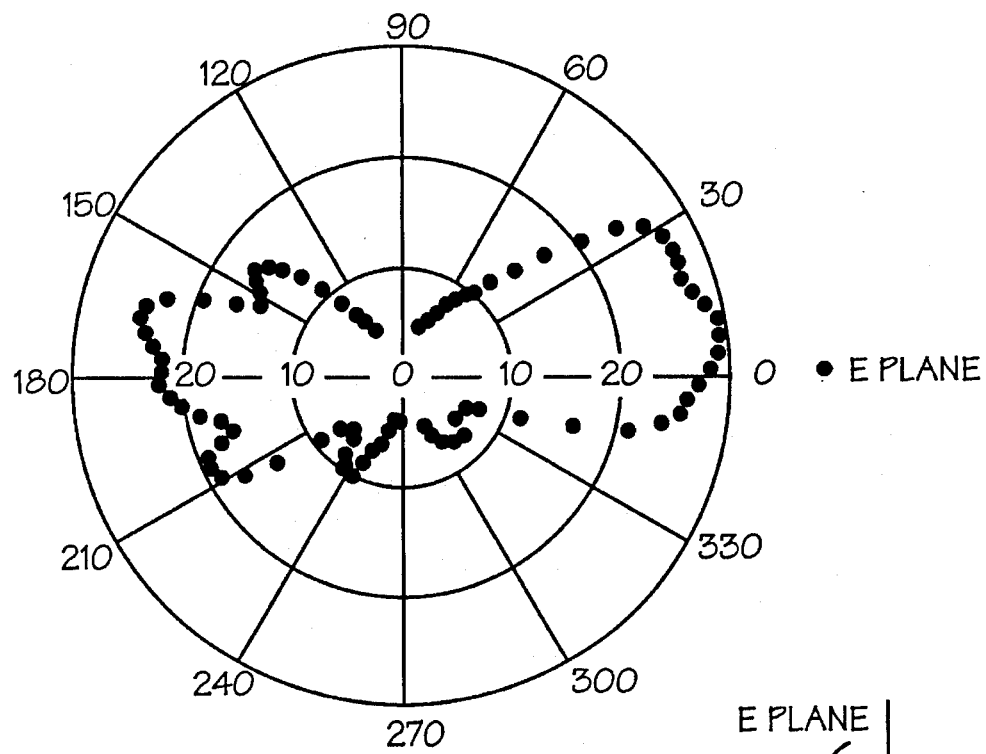
FIGS. 3a and 3b are the scattering patterns (CRCS) of the transponder, showing how it responds to interrogation from various angles when viewed from above as shown in FIG. 3a and from the side as shown in FIG. 3b.
Figure 3B:
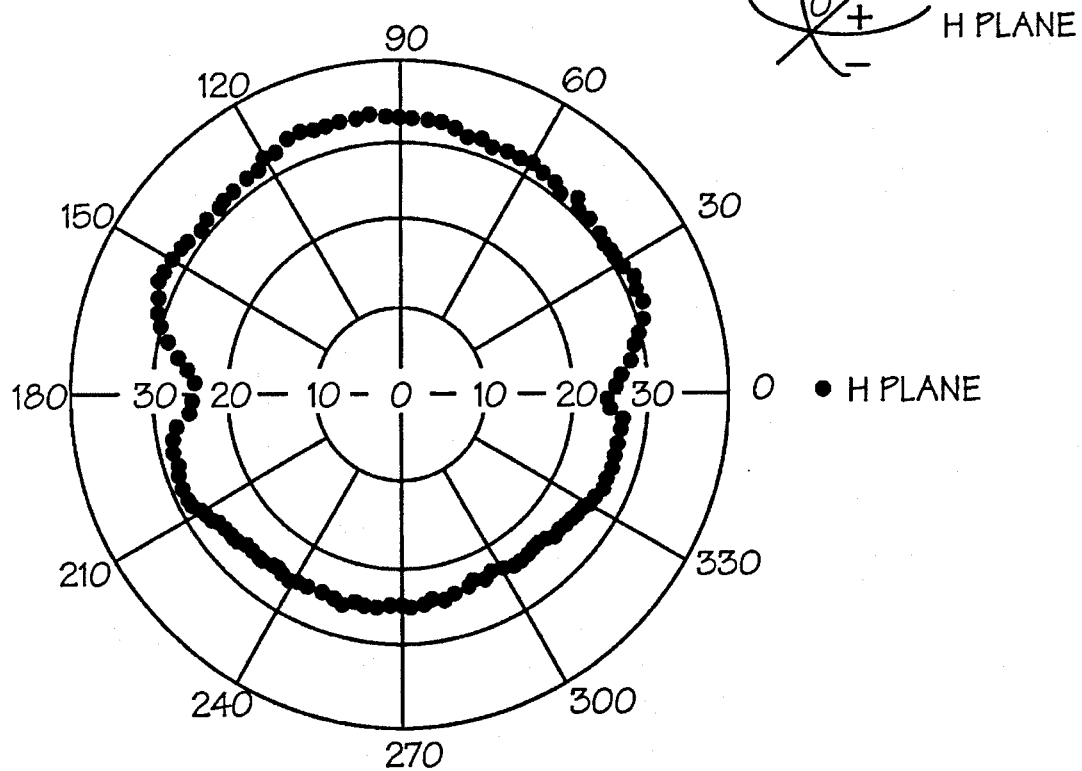

For RF/ID system calculations, the transponder can be modeled as a frequency converter with conversion loss Lc, with a receiving antenna (gain Gr) and a transmitting antenna (gain Gt) for the interrogation and response waves, respectively. Whereas Lc can be obtained via nonlinear circuit analysis, only the ratio Gr*Gt/Lc can be measured experimentally. It is therefore helpful to define a conversion radar cross section (CRCS), for the transponder, equivalent to the conventional radar cross section, but with nonequal incident and scattered frequencies corresponding to the interrogation and response signals. The following relation then applies:

$$CRCS = (wavelength^2) * Gr * Gt / (4 * pi * Lc) \quad (1)$$

or equivalently in decibels, where CRCS=3 dB cm$^2$–Lc for 6 GHz interrogation and an isotropic transponder. This quantity can be used directly in link calculations, and was measured for both E and H plane cuts of the transponder's scattering pattern as shown in FIGS. 3a and b respectively. Since the signals applied to the mixer are relatively small (<−10 dBm), a convenient expression for Lc can be obtained in terms of Volterra kernels for the nonlinear equivalent circuit. This expression indicates that the transponder's conversion loss for the weakly nonlinear case (away from the interrogator) is inversely proportional to received interrogation power. Consequently, the back-scattered response power received by the interrogator will vary as $1/r^6$, where r is the distance to the transponder, rather than the $1/r^4$ characteristic of a range-independent radar cross section. The resulting maximum range is approximately 10 feet as illustrated in FIG. 4 where received response power is graphed on line 32 against distance between the interrogation system and transponder 10 for the test interrogation system described earlier. Line 30 is the −105 dBm receiver sensitivity limit in this example. The complex region 34 is the zone where in the test situation of this example the interrogation system received multipath response signals from transponder 10. Increasing the EIRP, or using an optimum-bandwidth receiver could increase this range to over 15 feet. For fixed-frequency operation, additional tuning elements may be added to the quasi-optical mixer to further reduce the conversion loss.

The practicality of a self-contained identification transponder using subharmonic interrogation is demonstrated by the illustrated embodiment. Integrating the ancillary circuitry using applications specific integrated circuit (ASIC) technology could reduce size and power requirements to the point where the battery could be hermetically sealed inside the card or eliminated altogether through beam powering, resulting in a commercially viable identification device.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

In addition to the equivalents of the claimed elements, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An improvement in a contactless transponder having a modulation oscillator, a quasi-optical mixer having a first input coupled to said modulation oscillator and an antenna having an input coupled to an output of said mixer comprising:

an identification code generator coupled to a second input of said mixer, wherein said mixer modulates an interrogation signal received by said antenna having a frequency, $f_i$, with a data carrier signal having a frequency, $f_d$, generated by said modulation oscillator to transmit supressed-carrier double sideband response signals, wherein each sideband response signal is modulated by an identification code generated by said identification code generator, said data frequency, $f_d$, being at a nonharmonic value of said interrogation frequency, $f_i$, whereby false detection arising from reflections of transmitted harmonics of said interrogation signal is avoided.

2. The improvement of claim 1 where said antenna is a bow-tie antenna and said suppressed carrier frequency is at a second harmonic, $2f_i$, of said interrogation frequency, $f_i$, said double sideband response signals having a frequency of $2f_i \pm f_d$.

3. The improvement of claim 1 wherein said response signal generated by said transponder is characterized by two or more upper and lower modulated sideband response signals each.

4. The improvement of claim 1 wherein said modulation oscillator generates a plurality of data carrier signals, $f_{di}$, so that said transponder generates a corresponding plurality of upper and lower modulated sideband response signals.

5. The improvement of claim 1 further comprising a source of power coupled to said transponder, a slot antenna, a diode coupled to said slot antenna, and a detector circuit coupled to said diode for detecting when an interrogation signal is received by said slot antenna and diode, said detector circuit generating a detection signal indicative of interrogation of said transponder, said interrogation signal being coupled to said transponder to change the state of operation of said transponder from a power-save mode with minimum power consumption to a more power consuming operating mode.

6. The improvement of claim 5 wherein said slot antenna is tuned for said interrogation frequency, $f_i$.

7. The improvement of claim 2 wherein said slot antenna is tuned for said interrogation frequency, $f_i$.

8. The improvement of claim 4 further comprising a source of power coupled to said transponder, a slot antenna, a diode coupled to said slot antenna, and a detector circuit coupled to said diode for detecting when an interrogation signal is received by said slot antenna and diode, said detector circuit generating a detection signal indicative of interrogation of said transponder, said interrogation signal being coupled to said transponder to change the state of operation of said transponder from a power-save mode with minimum power consumption to a more power consuming operating mode.

9. The improvement of claim 3 wherein said modulation oscillator generates a plurality of carrier data signals, $f_{di}$, so that said transponder generates a corresponding plurality of upper and lower sideband response signals.

10. An improvement in a contactless transponder having a modulation oscillator, a quasi-optical mixer having a first input coupled to said modulation oscillator and an antenna having an input coupled to an output of said mixer comprising:

an identification code generator coupled to a second input of said mixer, wherein said modulation oscillator generates a plurality of data carrier signals, wherein said mixer modulates an interrogation signal received by said antenna having a frequency, $f_i$, with said plurality of data carrier signal each having a frequency, $f_{di}$, generated by said modulation oscillator to transmit supressed-carrier double sideband response signals, wherein each of said plurality of sideband response signals is modulated by an identification code generated by said identification code generator.

11. The improvement of claim 10 further comprising a source of power coupled to said transponder, a slot antenna, a diode coupled to said slot antenna, and a detector circuit for detecting when an interrogation signal is received by said slot antenna and diode, said detector circuit generating a detection signal indicative of interrogation of said transponder, said interrogation signal being coupled to said transponder to change the state of operation of said transponder from a power-save mode with minimum power consumption to a more power consuming operating mode.

12. The improvement of claim 10 wherein each of said response signals generated by said transponder is characterized by two or more upper and lower modulated side band signals each.

13. A method for providing an identification response to an interrogation signal comprising:

generating a data carrier signal having a frequency, $f_d$;

modulating said data carrier signal with an identification code;

receiving an interrogation signal having a frequency, $f_i$;

mixing said modulated data signal at frequency, $f_d$, and interrogation signal at frequency, $f_i$, to obtain a suppressed-carrier double sideband modulated response signal, whereby a reliably detectable response signal is generated in said transponder.

14. The method of claim 13 where generating said data carrier signal is at a frequency which is a nonharmonic of said interrogation frequency, $f_i$, so that false detections resulting from reflected interrogating signals of transmitted harmonics is avoided.

15. The method of claim 13 further comprising receiving said interrogation signal at frequency, $f_i$;

detecting said received interrogation signal;

activating said transponder from a power-save mode to an operable mode where power is consumed when said interrogation signal is received.

16. The method of claim 15 where receiving said interrogation signal is received with a tuned slot antenna.

17. The method of claim 16 where detecting said interrogation signal is detected in a Schottky diode coupled to said tuned slot antenna.

18. The method of claim 13 where generating said data carrier signal at said data frequency, $f_d$, comprises generating a plurality of distinct data carrier signals, each at a different frequency, $f_{di}$, to permit subsequent simultaneous interrogation of multiple transponders.

19. The method of claim 18 where generating said data carrier signal at said data frequency, $f_d$, comprises generating a plurality of distinct data carrier signals, each at a different frequency, $f_{di}$, to permit subsequent simultaneous interrogation of multiple transponders.

20. The method of claim 13 wherein said data carrier signal is a radio frequency signal and said interrogation signal is a microwave signal.

* * * * *